US010673370B2

(12) United States Patent
Kim et al.

(10) Patent No.: US 10,673,370 B2
(45) Date of Patent: Jun. 2, 2020

(54) THREE-PHASE MOTOR CONTROL CIRCUIT AND THREE-PHASE MOTOR CONTROL METHOD

(71) Applicant: MANDO CORPORATION, Gyeonggi-do (KR)

(72) Inventors: Nam Gyun Kim, Gyeonggi-do (KR); Jong Mu Lee, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/057,815

(22) Filed: Aug. 8, 2018

(65) Prior Publication Data
US 2019/0052217 A1    Feb. 14, 2019

(30) Foreign Application Priority Data

Aug. 8, 2017    (KR) .......................... 10-2017-0100076

(51) Int. Cl.
*H02P 27/06* (2006.01)
*H02P 29/024* (2016.01)
*H02P 29/032* (2016.01)

(52) U.S. Cl.
CPC ............ *H02P 29/024* (2013.01); *H02P 27/06* (2013.01); *H02P 29/032* (2016.02)

(58) Field of Classification Search
CPC ..... H02P 27/06; B62D 5/0484; B62D 5/0481; B62D 5/046; B62D 5/0487; B62D 5/0493
See application file for complete search history.

(56) References Cited

U.S. PATENT DOCUMENTS

| 5,552,684 | A  | * | 9/1996 | Wada | B62D 5/0493 318/293 |
| 6,497,303 | B1 | * | 12/2002 | Nishimura | B62D 5/0487 180/443 |
| 6,973,992 | B2 | * | 12/2005 | Yoneda | B62D 5/046 180/446 |
| 8,169,174 | B2 | * | 5/2012 | Shibata | B62D 5/0484 180/402 |
| 8,660,755 | B2 | * | 2/2014 | Kuroda | B62D 5/0481 180/443 |
| 8,698,435 | B2 | * | 4/2014 | Tada | H02H 7/0844 318/400.21 |
| 8,789,645 | B2 | * | 7/2014 | Kawanaka | B62D 5/0484 180/404 |
| 8,941,337 | B2 | * | 1/2015 | Uryu | H02P 27/06 318/139 |

* cited by examiner

*Primary Examiner* — Rina I Duda
(74) *Attorney, Agent, or Firm* — Ladas & Parry, LLP

(57) ABSTRACT

The present disclosure relates to a three-phase motor control circuit including an inverter circuit configured to convert input power into three-phase power, a relay switch configured to determine whether the three-phase power is input to a three-phase motor on the basis of a control signal of an operational level, an operation circuit configured to calculate the three-phase power and the input power to generate the operational level, and an amplification circuit configured to amplify a control signal of an initial level, which is generated by a controller for operating the relay switch, to be a control signal of the operational level on the basis of the generated operational level.

13 Claims, 5 Drawing Sheets

THREE-PHASE MOTOR CONTROL CIRCUIT AND THREE-PHASE MOTOR CONTROL METHOD

CROSS REFERENCE TO RELATED APPLICATION

This application claims priority from Korean Patent Application No. 10-2017-0100076, filed on Aug. 8, 2017, which are hereby incorporated by reference for all purposes as if fully set forth herein.

BACKGROUND OF THE INVENTION

1. Field of the Invention

The present disclosure relates to a three-phase motor control circuit.

2. Description of the Prior Art

In an inverter circuit for converting input power to supply the converted power to a three-phase motor, over-power or under-power may be supplied to the three-phase motor due to unintended factors.

Consequently, a problem in that the three-phase motor fails or malfunctions may occur.

Recently, a relay switch for determining a supply of power is connected between an output terminal of an inverter circuit and a three-phase motor to resolve the above-described problem.

Meanwhile, since an input power is applied to a source terminal of the relay switch when the relay switch is used as a field effect transistor (FET), the relay switch may operate normally only when a control signal having a threshold value equal to or greater than the input power is input.

Therefore, in the conventional method of resolving the above-described problem, the relay switch for determining a supply of power is connected between the output terminal of the inverter circuit and the three-phase motor, and a gate driver is used to convert a control signal generated by a controller into a control signal having a threshold value equal to or greater than an input power.

Thus, there is a problem in that costs become a burden to industries due to the gate driver for converting a control signal into a control signal having a threshold value equal to or greater than an input power.

Further, the conventional method which determines whether over-power or under-power is supplied to a three-phase motor controls an operation of a relay switch by determining a failure of the three-phase motor or a partial failure of a controller through the controller.

SUMMARY OF THE INVENTION

In this background, the present disclosure is to provide a three-phase motor control technique including a function capable of operating a relay switch for determining a supply of power which is input to a three-phase motor without using an existing gate driver.

Further, the present disclosure is to provide a three-phase motor control technique capable of operating a relay switch by further determining a failure of an inverter circuit without direct control of a controller.

To solve the foregoing problem, an embodiment provides a three-phase motor control circuit including an inverter circuit configured to convert input power into three-phase power, a relay switch configured to determine whether the three-phase power is input to a three-phase motor on the basis of a control signal of an operational level, an operation circuit configured to calculate the three-phase power and the input power to generate the operational level, and an amplification circuit configured to amplify a control signal of an initial level, which is generated by a controller for operating the relay switch, to be a control signal of the operational level on the basis of the generated operational level.

Another embodiment provides a three-phase motor control method including converting input power into three-phase power, determining whether the three-phase power is input to a three-phase motor on the basis of a control signal of an operational level, generating the operational level by calculating the three-phase power and the input power, and amplifying a control signal of an initial level, which is generated by a controller for operating a relay switch, to be a control signal of the operational level on the basis of the generated operational level.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
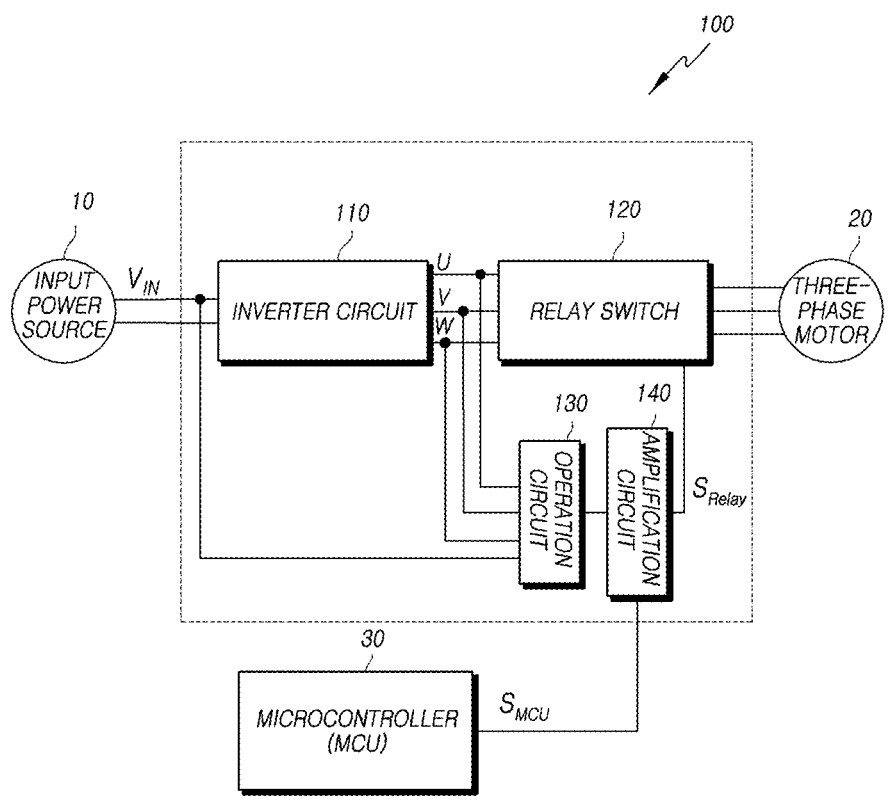
FIG. 1 is a diagram illustrating an example for describing a three-phase motor control circuit according to a first embodiment.

Hereinafter, some embodiments will be described in detail with reference to the illustrative drawings. In giving reference numerals to components of the drawings, the same reference numerals may be given to the same components even though the same components are shown in different drawings. Further, in the following description of the present disclosure, when a detailed description of related known configurations or functions is determined to obscure the gist of the present disclosure, the detailed description thereof will be omitted.

Furthermore, in describing components of embodiments of the present disclosure, a first, a second, A, B, (a), (b), and the like may be used. These terms are intended to distinguish one component from other components, but the nature, sequence, order, or number of the components is not limited by those terms. When a component is described as being "connected," "coupled," or "contacted" to another component, the component may be directly connected or contacted to another component, but it should be understood that another component(s) could be "interposed" between the component and another component or could be "connected," "coupled," or "contacted" therebetween.

A general three-phase motor control circuit may include an inverter circuit for converting a direct current (DC) input power into a three-phase power, a relay switch for determining whether the three-phase power is input to the three-phase motor, and a gate driver of the relay switch for amplifying an initial level of a control signal generated by a microcontroller (MCU) to be a predetermined operational level.

The inverter circuit is a circuit in which three serial switches having two switches connected in series are connected in parallel, and the inverter circuit may receive power $V_{IN}$ through two terminals thereof, which are nodes to which the serial switches are connected in parallel, and output three-phase power U, V, and W through three terminals thereof, which are nodes to which the serial switches are connected in parallel.

The relay switch may be connected in series between the three-phase motor and output terminals of the inverter circuit, from which the three-phase power U, V, and W is output, to apply (ON) or block (OFF) the three-phase power U, V, and W to or from the three-phase motor on the basis of a control signal of an operational level. The relay switch may employ any type of relay switches, and in the following embodiments, the relay switch will be described by being limited to a relay switch using a field effect transistor (FET). The relay switch is sometimes referred to as a phase FET. Here, the operational level refers to a level of the control signal for turning the relay switch on, and the operational level is determined according to specifications of the relay switch. Thus, the operational level may have various voltage values, but the relay switch generally used for steering motor control has a voltage value of about 24 V.

The MCU may detect an abnormality of the MCU or the three-phase motor, and when an abnormality is detected in the MCU or the three-phase motor, the MCU may output a control signal of an initial level for turning the relay switch off. Here, the initial level refers to a level of a control signal which is basically output from the MCU, and the initial level is determined according to specifications of the MCU. Thus, the initial level may have various voltage values, and the MCU generally used for steering motor control has a voltage value of about 5 V.

The gate driver of the relay switch may convert a control signal of an initial level generated by the MCU into a control signal of the operational level to turn the relay switch on or off as intended in the MCU. Generally, the gate driver internally includes a charge pump which increases a battery voltage to be the operational level. Accordingly, the gate driver of the relay switch may increase the battery voltage to be an operational level, which is higher than or equal to a previously known threshold voltage of the relay switch, using the charge pump which is internally included in the gate driver, and using the operational level, the gate driver of the relay switch may convert the battery voltage into a control signal of the operational level.

More specifically, when the MCU and the three-phase motor are normal, the MCU of the general three-phase motor control circuit outputs a control signal of a high initial level of 5 V, the gate driver of the relay switch converts the control signal of the high initial level of 5 V into a control signal of a high operational level of 24 V, and the relay switch is turned on according to the control signal of the high operational level of 24 V such that the three-phase power U, V, and W output from the inverter circuit may be applied to the three-phase motor.

In contrast, when the MCU and the three-phase motor are abnormal, the MCU of the general three-phase motor control circuit outputs a control signal of a low initial level of 0 V, the gate driver of the relay switch converts the control signal of the low initial level of 0 V into a control signal of a low operational level of 0 V, and the relay switch is turned off according to the control signal of the low operational level of 0 V such that the three-phase power U, V, and W output from the inverter circuit may be blocked so as to prevent application to the three-phase motor.

The gate driver of the relay switch included in the above-described general three-phase motor control circuit is mainly used in the relay switch because the gate driver may easily configure a circuit and may output a stable operational level.

However, in terms of reduction in production costs, there is a demand for a circuit capable of replacing the gate driver of the relay switch. Further, in terms of stability, there is a need for a circuit capable of blocking three-phase power U, V, and W even when the MCU and three-phase motor fail as well as when the inverter circuit fails.

Hereinafter, as a circuit for resolving the above-described problems and needs, a three-phase motor control circuit including an operation circuit and an amplification circuit will be described in detail.

FIG. 1 is a diagram illustrating an example for describing a three-phase motor control circuit according to a first embodiment;

Referring to FIG. 1, a three-phase motor control circuit 100 according to the first embodiment may include an inverter circuit 110 for converting power $V_{IN}$ output from an input power source 10 into three-phase power U, V, and W, a relay switch 120 for determining whether the three-phase power U, V, and W is input to a three-phase motor 20 on the basis of a control signal $S_{Relay}$ of an operational level, an operation circuit 130 for generating the operational level by calculating the three-phase power U, V, and W and the power $V_{IN}$ output from the input power source 10, and an amplification circuit 140 for amplifying a control signal $S_{MCU}$ of an initial level, which is generated by an MCU 30, for operating the relay switch 120 to be the control signal $S_{Relay}$ of the operational level on the basis of the operational level.

The inverter circuit 110 of the three-phase motor control circuit 100 according to the first embodiment is a circuit in which three serial switches are connected in parallel, each of which has two switches connected in series, and the inverter circuit 110 may receive the power $V_{IN}$ output from the input power source 10 through two terminals thereof, which are nodes to which the serial switches are connected in parallel, outputs three-phase power U, V, and W through three terminals thereof, which are nodes connected in series to the serial switches. A maximum value of the three-phase power U, V, and W may be determined as a voltage in consideration of a voltage drop according to elements included in the inverter circuit 110 at the power $V_{IN}$ output from the input power source 10, but in the following description, a pulse waveform having a maximum value of 12 V according to an input power of 12 V will be described without considering the voltage drop.

The inverter circuit 110 is generally used to output a DC voltage as the three-phase power U, V, and W, and thus a detailed description thereof will be omitted.

The relay switch 120 of the three-phase motor control circuit 100 according to the first embodiment may be connected in series between the three-phase motor 20 and output terminals of the inverter circuit 110, from which the three-phase power U, V, and W is output, to apply (ON) or block (OFF) the three-phase power U, V, and W to or from the three-phase motor 20 on the basis of a control signal of an operational level. Here, the operational level refers to a level of the control signal for turning the relay switch 120 on, and the operational level is determined according to specifications of the relay switch 120. Accordingly, the operational level may have various values, but the operational level has a voltage value of about 24 V based on a relay switch generally used for steering motor control.

The operation circuit 130 of the three-phase motor control circuit 100 according to the first embodiment may generate an operational level by calculating the power $V_{IN}$ output from the input power source 10 and the three-phase power U, V, and W output from the inverter circuit 110.

This will be described in detail with reference to FIG. 2 which is a diagram illustrating an example for describing the operation circuit 130 according to the first embodiment.

Figure 2:
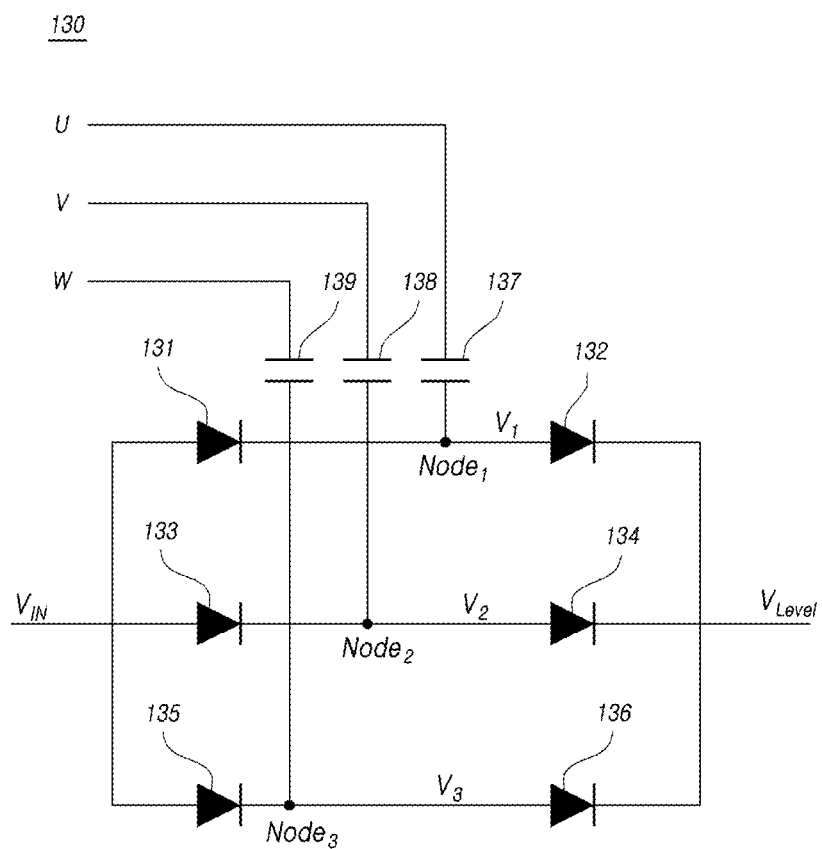
FIG. 2 is a diagram illustrating an example for describing an operation circuit according to the first embodiment.

Referring to FIG. 2, the operation circuit 130 may be configured such that a cathode of a first diode 131 and an anode of a second diode 132 are connected to a first node $Node_1$ to which first U-phase power is applied, a cathode of a third diode 133 and an anode of a fourth diode 134 are connected to a second node $Node_2$ to which second V-phase power is applied, a cathode of a fifth diode 135 and an anode of a sixth diode 136 are connected to a third node $Node_3$ to which third W-phase power is applied, the power $V_{IN}$ output from the input power source 10 is supplied to anodes of the first, third, and fifth diodes 131, 133, and 135, and cathodes of the second, fourth, and sixth diodes 132, 134, and 136 are connected to an input terminal of the amplification circuit 140. The first U-phase power, the second V-phase power, and the third W-phase power refer to phase power constituting the three-phase power U, V, and W.

Thus, the operation circuit 130 may generate a first operational level $V_1$ by calculating the first U-phase power and the power $V_{IN}$ output from the input power source 10, a second operational level $V_2$ by calculating the second V-phase power and the power $V_{IN}$ output from the input power source 10, a third operational level $V_3$ by calculating the third W-phase power W and the power $V_{IN}$ output from the input power source 10, and an operational level $V_{Level}$ by calculating the first operational level $V_1$, the second operational level $V_2$, and the third operational level $V_3$.

Here, the power $V_{IN}$ output from the input power source 10 has a voltage level of 12 V, a maximum value of each of the first U-phase power, the second V-phase power, and the third W-phase power, which are pulse waveforms, is a voltage level of 12 V, and a minimum value thereof is a voltage level of 0 V. Accordingly, each of the first operational level $V_1$, the second operational level $V_2$, and the third operational level $V_3$ may be a pulse waveform having a maximum value of 24 V and a minimum value of 12 V. Further, the operational level $V_{Level}$ may be a DC waveform having a voltage level of 24 V. That is, the operation circuit 130 includes a function of a conventional charge pump.

Meanwhile, capacitors 137, 138, and 139 are respectively connected between the first U-phase power and the first node $Node_1$, between the second V-phase power and the second node $Node_2$, and between the third W-phase power and the third node $Node_3$ such that the operation circuit 130 may maintain the first U-phase power, the second V-phase power, and the third W-phase power. This is for accurately calculating the power $V_{IN}$ output from the input power source 10 and each of the first U-phase power, the second V-phase power, and the third W-phase power. When the capacitors 137, 138, and 139 are not connected, calculation of the power $V_{IN}$ output from the input power source 10 and each of the first U-phase power, the second V-phase power, and the third W-phase power is not performed so that there is a problem in that each of the first operational level $V_1$, the second operational level $V_2$, and the third operational level $V_3$ is output as a DC waveform having a voltage level of 12 V.

According to one embodiment, when one or two among the three-phase power U, V, and W are not supplied, the operation circuit 130 may generate an operational level by calculating the power $V_{IN}$ output from the input power source 10 and supplied power among the three-phase power U, V, and W. For example, when a circuit for supplying the first U-phase power fails, the operation circuit 130 may generate an operational level by calculating the power $V_{IN}$ output from the input power source 10 and each of the second V-phase power and the third W-phase power. Further, when circuits for supplying the first U-phase power and the second V-phase power fail, the operation circuit 130 may generate an operational level by calculating the third W-phase power and the power $V_{IN}$ output from the input power source 10. Consequently, even when one or two among the circuits for supplying the three-phase power U, V, and W fail, the operation circuit 130 may stably generate the operational level such that redundancy for failure may be secured.

The amplification circuit 140 of the three-phase motor control circuit 100 according to the first embodiment may amplify the control signal $S_{MCU}$ of an initial level, which is generated by the MCU 30 for operating the relay switch 120, to be the control signal $S_{Relay}$ of an operational level on the basis of the operational level generated by the operation circuit 130.

This will be described in detail with reference to FIG. 3 which is a diagram illustrating an example for describing the amplification circuit 140 according to the first embodiment.

Figure 3:
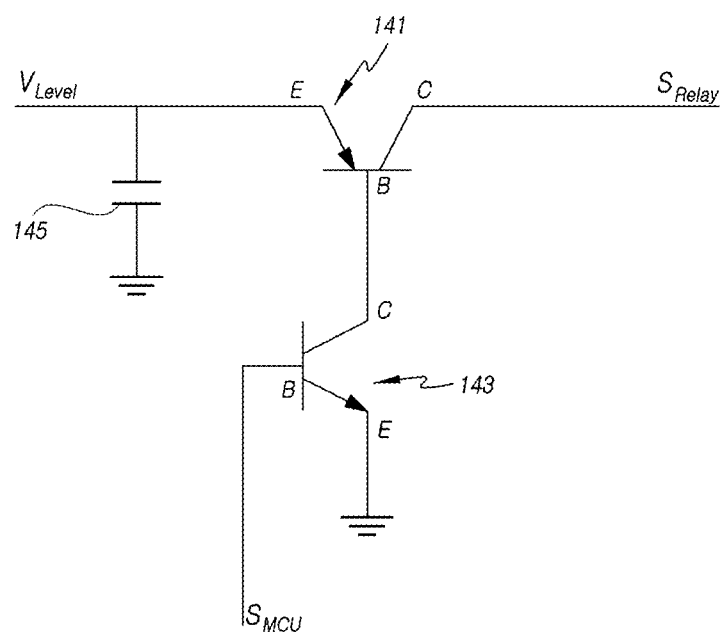
FIG. 3 is a diagram illustrating an example for describing an amplification circuit according to the first embodiment.

Referring to FIG. 3, the amplification circuit 140 is configured such that an operational level generated by the operation circuit 130 is applied to an emitter E of a PNP-bipolar junction transistor (BJT) 141, a gate G of the relay switch 120 is connected to a collector C of the PNP-BJT 141, a base B of the PNP-BJT 141 is connected to a collector C of an NPN-BJT 143, a control signal $S_{MCU}$ of an initial level generated by the MCU 30 is applied to a base B of the NPN-BJT 143, and an emitter E of the NPN-BJT 143 is grounded such that the amplification circuit 140 may amplify the control signal $S_{MCU}$ of the initial level to be the control signal $S_{Relay}$ of the operational level.

Unlike an FET, a BJT may be operated according to a control signal of an initial level generated by the MCU 30. Further, the PNP-BJT 141 may be turned on when a GND signal is applied and may be turned off when a high level voltage is applied, and the NPN-BJT 143 may be turned on when the high level voltage is applied and may be turned off when the GND signal is applied.

Thus, when a high level voltage is applied from the MCU 30 to the base B of the NPN-BJT 143 as the control signal of the initial level, the NPN-BJT 143 is turned on and the GND signal is applied to the base B of the PNP-BJT 141 such that the PNP-BJT 141 may be turned on. Consequently, an operational level $V_{Level}$ may be applied to the gate of the relay switch 120.

In contrast, when a low level voltage is applied from the MCU 30 to the base B of the NPN-BJT 143 as the control signal of the initial level, the NPN-BJT 143 is turned off, and a high level voltage is applied to the base B of the PNP-BJT 141 such that the PNP-BJT 141 may be turned off. Thus, a voltage level of 0 V may be applied to the gate of the relay switch 120 by a pull-down resistor (not shown) connected between the collector C of the PNP-BJT 141 and the ground.

As a result, the amplification circuit 140 may amplify the control signal of the initial level to be a control signal of the operational level corresponding to the operational level generated by the operation circuit 130.

Meanwhile, a capacitor 145 is connected between a node of the operational level $V_{Level}$ and a node of the ground so that the amplification circuit 140 may maintain the operational level $V_{Level}$. When the capacitor 145 is not connected therebetween, a discontinuity of the operational level $V_{Level}$ may occur. The discontinuity means that each of the first U-phase power, the second V-phase power, and the third W-phase power has a zero voltage value at a point where a voltage value of the signal is changed instead of having a fixed voltage value.

According to one embodiment, the amplification circuit 140 may further include a Zener diode connected to the input terminal of the amplification circuit 140. The Zener diode may output a predetermined constant voltage to stabilize a voltage supplied to the amplification circuit 140. The amplification circuit 140 may be stably operated at the predetermined constant voltage output from the Zener diode.

According to one embodiment, the amplification circuit 140 may further include a sensor for monitoring a voltage applied to each terminal or a current flowing to each terminal. A voltage value or a current value sensed by the sensor may be sent to the MCU 30. The MCU 30 may output a control signal on the basis of pieces of received information.

Figure 4:
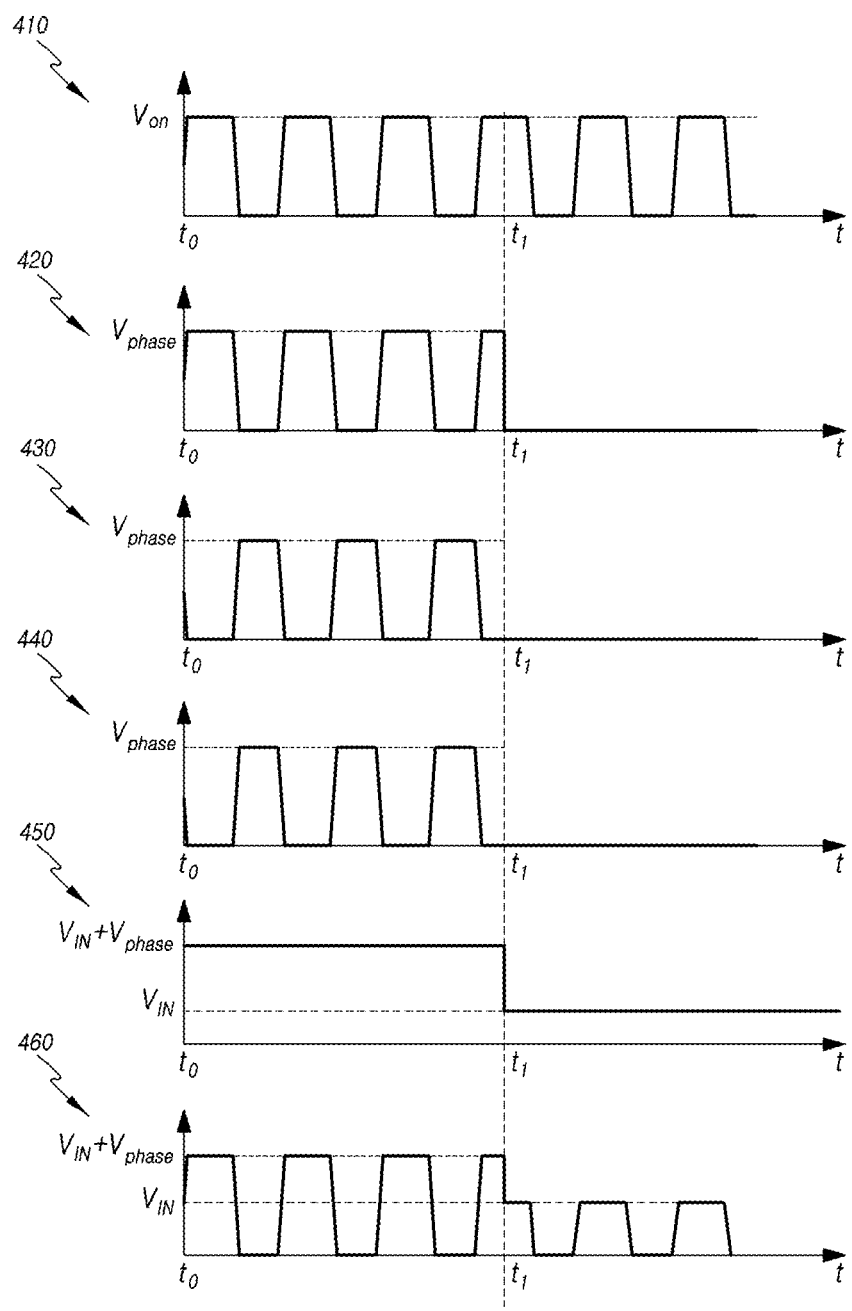
FIG. 4 is a diagram illustrating an example for describing an operation of the three-phase motor control circuit according to the first embodiment.

The above-described three-phase motor control circuit 100 according to the first embodiment may be operated as shown in FIG. 4.

FIG. 4 is a diagram illustrating an example for describing an operation of the three-phase motor control circuit according to the first embodiment, and FIG. 4 illustrates a control signal 410 ($S_{MCU}$) of an initial level according to time t, a first U-phase power 420 according to the time t, the second V-phase power 430 according to the time t, the third W-phase power 440 according to the time t, an operational level 450 ($V_{Level}$) according to the time t, and a control signal 460 ($S_{Relay}$) of the operational level according to the time t, and FIG. 4 illustrates a situation in which a failure occurs in the inverter circuit 110 at a time $t_1$, and after the time $t_1$, each of the first U-phase power 420, the second V-phase power 430, and the third W-phase power 440, which are erroneous three-phase power, has a zero voltage level.

Referring to FIG. 4, the MCU 30 may generate the control signal 410 ($S_{MCU}$) of an initial level having a peak value $V_{ON}$, the inverter circuit 110 may convert input power $V_{IN}$ into the first U-phase power 420, the second V-phase power 430, and the third W-phase power 440, each of which has a peak value $V_{phase}$, the operation circuit 130 may generate the operational level 450 ($V_{Level}$), and the amplification circuit 140 may convert the control signal 410 ($S_{MCU}$) of the initial level into the control signal 460 ($S_{Relay}$) of the operational level 450 ($V_{Level}$).

More specifically, the operation circuit 130 may generate an operational level which is $V_{IN}+V_{phase}$ before the time $t_1$ and may generate an operational level which is $V_{IN}$ after the time $t_1$ by calculating the input power $V_{IN}$ and three-phase power U, V, and W including the first U-phase power 420, the second V-phase power 430, and the third W-phase power 440.

Thus, the amplification circuit 140 may amplify the control signal 410 ($S_{MCU}$) of the initial level generated by the MCU 30 to be the operational level generated by the operation circuit 130 to output the control signal 460 ($S_{Relay}$) of the operational level. That is, the control signal 460 ($S_{Relay}$) of the operational level may be generated as a control signal of a normal operational level which is $V_{IN}+V_{phase}$ before the time $t_1$ and may be generated as a control signal of an abnormal erroneous operational level which is $V_{IN}$ after the time $t_1$. The normal operational level refers to a voltage level of $V_{IN}+V_{phase}$ which is an operational level capable of turning the relay switch 120 on, and the erroneous operational level refers to a voltage level of $V_{IN}$ which is an operational level not capable of turning the relay switch 120 on.

In summary, when an error occurs in the inverter circuit 110 and the erroneous three-phase power is converted, the amplification circuit 140 inputs a control signal of an erroneous operational level to the relay switch 120 due to the erroneous operational level which is generated by calculating the erroneous three-phase power and the input power $V_{IN}$ in the operation circuit 130, and thus the relay switch 120 is turned off such that the three-phase power U, V, and W are not applied to the three-phase motor 20.

In contrast, when the inverter circuit 110 is operated normally and a normal three-phase power is converted, the amplification circuit 140 inputs a control signal of a normal operational level to the relay switch 120 due to the normal operational level which is generated by calculating the normal three-phase power and the input power $V_{IN}$ in the operation circuit 130, and thus the relay switch 120 is turned on such that the three-phase power U, V, and W is applied to the three-phase motor 20.

That is, the three-phase motor control circuit 100 according to the first embodiment may be operated the following Table 1.

TABLE 1

| Whether inverter circuit fails | Control signal of initial level | Operational level | Operation of relay switch |
|---|---|---|---|
| When inverter circuit is normal | Low | $V_{IN} + V_{phase}$ | OFF |
| When inverter circuit is normal | High | $V_{IN} + V_{phase}$ | ON |
| When inverter circuit fails | Low | $V_{IN}$ | OFF |
| When inverter circuit fails | High | $V_{IN}$ | OFF |

The control signal 410 ($S_{MCU}$) of the initial level of FIG. 4 shows an arbitrary generated waveform for describing the operation of the three-phase motor control circuit 100 according to the first embodiment, and in an actual operation, the control signal 410 ($S_{MCU}$) of the initial level may be different from a control signal of an initial level generated by the MCU 30.

As described above, the three-phase motor control circuit 100 according to the first embodiment, which is described with reference to FIGS. 1 to 4, may turn the relay switch 120 on or off on the basis of the control signal generated by the MCU 30 without using a gate driver of a relay switch.

Further, according to the three-phase motor control circuit 100 according to the first embodiment, there is an effect of being capable of protecting the three-phase motor 20 by blocking the three-phase power U, V, and W even when the MCU 30 and the three-phase motor 20 fail as well as the inverter circuit 110 fails.

Hereinafter, a three-phase motor control method, which is an operation performed by the three-phase motor control circuit 100 described with reference to FIGS. 1 to 4, will be briefly described.

Figure 5:
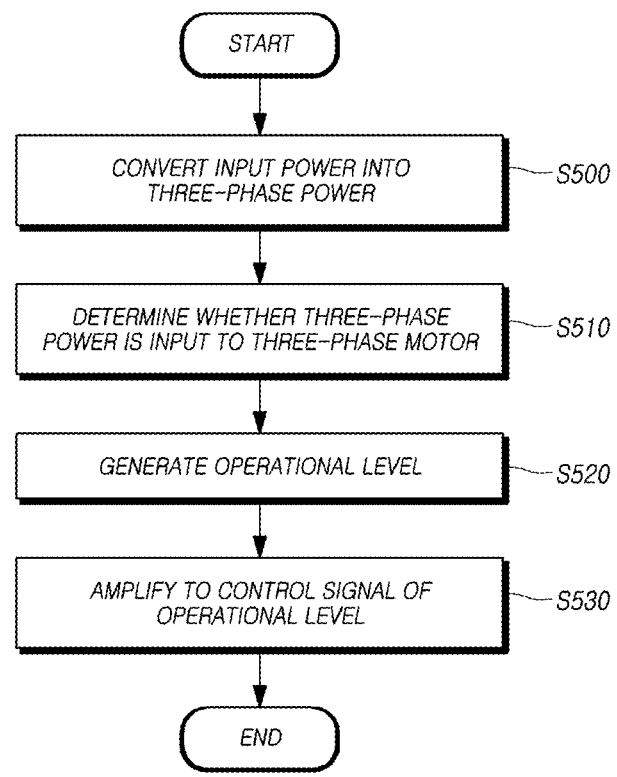
FIG. 5 is a flowchart illustrating a three-phase motor control method according to the first embodiment.

FIG. 5 is a flowchart illustrating a three-phase motor control method according to the first embodiment.

Referring to FIG. 5, the three-phase motor control method according to the first embodiment may include converting the input power $V_{IN}$ into the three-phase power U, V, and W (S500), determining whether the three-phase power U, V, and W is input to the three-phase motor 20 on the basis of a control signal of an operational level (S510), generating the operational level by calculating the three-phase power U, V, and W and the input power $V_{IN}$ (S520), and amplifying a control signal of an initial level, which is generated by the MCU 30 for operating the relay switch 120, to be a control signal of the operational level (S530).

The converting of the input power $V_{IN}$ into the three-phase power U, V, and W (S500) of the three-phase motor control method according to the first embodiment may include supplying the input power $V_{IN}$ to the input terminal of the inverter circuit 110 and obtaining the three-phase power U, V, and W at an output terminal of the inverter circuit 110.

The inverter circuit 110 is a circuit in which three serial switches are connected in parallel, each of which has two switches connected in series, and the inverter circuit 110 may receive an input power $V_{IN}$ through two terminals thereof, which are nodes to which the serial switches are connected in parallel, and output three-phase power U, V, and W through three terminals thereof, which are nodes connected in series to the serial switches. A maximum value of the three-phase power U, V, and W may be determined as a voltage in consideration of a voltage drop according to elements included in the inverter circuit 110 at the input power $V_{IN}$, but in the following description, a pulse waveform having a maximum value of 12 V according to an input power of 12 V will be described without considering the voltage drop.

The inverter circuit 110 is generally used to output a DC voltage as the three-phase power U, V, and W, and thus a detailed description thereof will be omitted.

The determining of whether the three-phase power U, V, and W is input to the three-phase motor 20 (S510) of the three-phase motor control method according to the first embodiment may include supplying the three-phase power U, V, and W to the input terminal of the relay switch 120, transmitting the control signal of the operational level to a control terminal of the relay switch 120, and determining whether the three-phase power U, V, and W is input to the three-phase motor 20.

That is, the relay switch 120 may be connected in series between the three-phase motor 20 and output terminals of the inverter circuit, 110 from which the three-phase power U, V, and W is output, to apply (ON) or block (OFF) the three-phase power U, V, and W to or from the three-phase motor 20 on the basis of the control signal of the operational level. Here, the operational level refers to a level of the control signal for turning the relay switch 120 on, and the operational level is determined according to specifications of the relay switch 120. Accordingly, the operational level may have various values, but the operational level has a voltage value of about 24 V based on a relay switch generally used for steering motor control.

The generating of the operational level (S520) of the three-phase motor control method according to the first embodiment may include generating the operational level by calculating the three-phase power U, V, and W and the input power $V_{IN}$. A specific operation of the generating of the operational level (S520) may be performed by inputting the three-phase power U, V, and W and the input power $V_{IN}$ to the operation circuit 130 shown in FIG. 2.

According to one embodiment, when one or two among the three-phase power U, V, and W are not supplied, the generating of the operational level (S520) may include generating an operational level by calculating the input power $V_{IN}$ and supplied power among the three-phase power U, V, and W. For example, when a circuit for supplying the first U-phase power fails, the operation circuit 130 may generate an operational level by calculating the input power $V_{IN}$ and each of the second V-phase power and the third W-phase power. Further, when circuits for supplying the first U-phase power and the second V-phase power fail, the operation circuit 130 may generate an operational level by calculating the third W-phase power and the input power $V_{IN}$. Consequently, even when one or two among the circuits for supplying the three-phase power U, V, and W fail, the operation circuit 130 may stably generate the operational level, such that redundancy for failure may be secured.

The amplifying of the control signal of the initial level to be the control signal of the operational level (S530) of the three-phase motor control method according to the first embodiment may include amplifying the control signal of the initial level, which is generated by the MCU 30 for operating the relay switch 120, to be the control signal of the operational level on the basis of the generated operational level. A specific operation of the amplifying of the control signal of the initial level (S530) may be performed by inputting the control signal of the initial level and the control signal of the operational level to the amplification circuit 140 shown in FIG. 3.

The three-phase motor control method according to the first embodiment shown in FIG. 5 may turn the relay switch 120 on or off on the basis of the control signal generated by the MCU 30 without using a gate driver of a relay switch.

Further, according to the three-phase motor control method according to the first embodiment, there is an effect of being capable of protecting the three-phase motor 20 by blocking the three-phase power U, V, and W even when the MCU 30 and the three-phase motor 20 fail as well as the inverter circuit 110 fails.

In addition, the three-phase motor control method may perform all the operations performed by the three-phase motor control circuit 100 described with reference to FIGS. 1 to 4.

As described above, according to the embodiments, a three-phase motor control technique including a function capable of operating a relay switch for determining a supply of power which is input to a three-phase motor without using an existing gate driver can be provided.

Further, the three-phase motor control technique capable of operating a relay switch by further determining a failure of an inverter circuit without direct intervention of a controller can be provided.

Although the three-phase motor has been described, the present disclosure is not limited thereto. The contents described in this disclosure may be applied to other motor systems in which the phase power of the motor is turned on and off except for a case in which the contents are practically difficult to apply.

The above description and the accompanying drawings are merely illustrative of the technical spirit of the present disclosure, and it should be understood that numerous modifications and variations, such as combination, separation, substitution, change, and the like, can be devised by those skilled in the art without departing from the essential features of the present disclosure. The embodiments disclosed herein, therefore, are not to be taken in a sense for limiting the technical spirit of the present disclosure but for explanation thereof, and the range of the technical spirit is not limited to these embodiments. The scope of the embodiments should be construed by the appended claims, along with the full range of equivalents to which such claims are entitled.

What is claimed is:

1. A three-phase motor control circuit comprising:
an inverter circuit configured to convert input power into three-phase power;
a relay switch configured to determine whether the three-phase power is input to a three-phase motor on the basis of a control signal having an operational level;
an operation circuit configured to generate the operational level based on the input power and the three-phase power received from the inverter circuit; and
an amplification circuit configured to amplify an initial level of the control signal, which is generated by a controller for operating the relay switch, to the operational level generated by the operational circuit and to output to the relay switch the control signal amplified to the operational level.

2. The three-phase motor control circuit of claim 1, wherein:
the three-phase power is determined as an erroneous three-phase power or a normal three-phase power according to whether the inverter circuit fails; and
when a control signal having an erroneous operational level, which is generated by calculating the erroneous three-phase power and the input power, is input, the relay switch does not input the three-phase power to the three-phase motor, and when a control signal having a normal operational level, which is generated by calculating the normal three-phase power and the input power, is input, the relay switch inputs the three-phase power to the three-phase motor.

3. The three-phase motor control circuit of claim 1, wherein:
the three-phase power includes a first U-phase power, a second V-phase power, and a third W-phase power; and
the operation circuit generates a first operational level by calculating the first U-phase power and the input power, generates a second operational level by calculating the second V-phase power and the input power, generates a third operational level by calculating the third W-phase power and the input power, generates the operational level by calculating the first operational level, the second operational level, and the third operational level.

4. The three-phase motor control circuit of claim 3, wherein, when one or two among the first U-phase power, the second V-phase power, and the third W-phase power are not supplied, the operation circuit generates the first, second, or third operational level by calculating the input power and a supplied power among the first U-phase power, the second V-phase power, and the third W-phase power.

5. The three-phase motor control circuit of claim 1, wherein:
the three-phase power includes a first U-phase power, a second V-phase power, and a third W-phase power; and
the operation circuit is configured such that a cathode of a first diode and an anode of a second diode are connected to a first node to which the first U-phase power is applied, a cathode of a third diode and an anode of a fourth diode are connected to a second node to which the second V-phase power is applied, a cathode of a fifth diode and an anode of a sixth diode are connected to a third node to which the third W-phase power is applied, anodes of the first, third, and fifth diodes are connected to the input power, and cathodes of the second, fourth, and sixth diodes are connected to an input terminal of the amplification circuit.

6. The three-phase motor control circuit of claim 5, wherein, in the operation circuit, a capacitor is connected between a node of the first U-phase power and the first node, between a node of the second V-phase power and the second node, and between a node of the third W-phase power and the third node such that the operational level is generated.

7. The three-phase motor control circuit of claim 1, wherein the amplification circuit is configured such that the operational level is applied to an emitter (E) of a PNP-bipolar junction transistor (BJT), a gate (G) of the relay switch is connected to a collector C of the PNP-BJT, a base (B) of the PNP-BJT is connected to a collector (C) of an NPN-BJT, the control signal of the initial level is applied to a base B of the NPN-BJT, and an emitter (E) of the NPN-BJT is grounded such that the amplification circuit amplifies the control signal of the initial level to be the control signal of the operational level.

8. The three-phase motor control circuit of claim 7, wherein the amplification circuit further includes a Zener diode for allowing the amplification circuit to operate at a predetermined voltage level.

9. The three-phase motor control circuit of claim 1, wherein a capacitor is connected between a node of the operational level and a node of a ground such that the amplification circuit maintains the operational level.

10. A three-phase motor control method comprising:
converting input power into three-phase power;
determining whether the three-phase power is input to a three-phase motor on the basis of a control signal having an operational level;
generating the operational level based on the three-phase power and the input power; and
amplifying an initial level of the control signal, which is generated by a controller for operating a relay switch, to the operational level and outputting the control signal amplified to the operational level.

11. The three-phase motor control method of claim 10, wherein the determining of whether the three-phase power is input to the three-phase motor includes:
when a control signal having an erroneous operational level, which is generated by calculating the input power and an erroneous three-phase power input when an inverter circuit fails, is input, blocking an input of the three-phase power to the three-phase motor; and
when a control signal having a normal operational level, which is generated by calculating the input power and a normal three-phase power input when the inverter circuit is normal, is input, inputting the three-phase power to the three-phase motor.

12. The three-phase motor control method of claim 10, wherein the generating of the operational level includes:
generating a first operational level by calculating the input power and a first U-phase power included in the three-phase power;
generating a second operational level by calculating the input power and a second V-phase power included in the three-phase power;
generating a third operational level by calculating the input power and a third W-phase power included in the three-phase power; and generating the operational level by calculating the first operational level, the second operational level, and the third operational level.

13. The three-phase motor control method of claim 12, wherein, when one or two among the first U-phase power, the second V-phase power, and the third W-phase power are not supplied, the generating of the operational level includes generating the first, second, or third operational level by calculating the input power and a supplied power among the first U-phase power, the second V-phase power, and the third W-phase power.

* * * * *